US012783888B2

(12) United States Patent
Yoshida et al.

(10) Patent No.: US 12,783,888 B2
(45) Date of Patent: Nov. 3, 2026

(54) MERGE DEVICE, MERGE METHOD, AND MERGE PROGRAM

(71) Applicant: NTT, Inc., Tokyo (JP)

(72) Inventors: Shuhei Yoshida, Tokyo (JP); Hiroyuki Uzawa, Tokyo (JP); Saki Hatta, Tokyo (JP); Yuya Omori, Tokyo (JP); Daisuke Kobayashi, Tokyo (JP); Ken Nakamura, Tokyo (JP); Koyo Nitta, Tokyo (JP)

(73) Assignee: NTT, Inc., Tokyo (JP)

( * ) Notice: Subject to any disclaimer, the term of this patent is extended or adjusted under 35 U.S.C. 154(b) by 721 days.

(21) Appl. No.: 18/037,645

(22) PCT Filed: Nov. 30, 2020

(86) PCT No.: PCT/JP2020/044520
§ 371 (c)(1),
(2) Date: May 18, 2023

(87) PCT Pub. No.: WO2022/113347
PCT Pub. Date: Jun. 2, 2022

(65) Prior Publication Data

US 2023/0409914 A1 Dec. 21, 2023

(51) Int. Cl.
*G06N 3/082* (2023.01)
*G06N 3/0464* (2023.01)
*G06V 10/82* (2022.01)

(52) U.S. Cl.
CPC ........... *G06N 3/082* (2013.01); *G06N 3/0464* (2023.01); *G06V 10/82* (2022.01)

(58) Field of Classification Search
CPC ........... G06N 3/00–20/00; G06V 10/00–40/00
USPC ........................................................ 706/1–902
See application file for complete search history.

(56) References Cited

U.S. PATENT DOCUMENTS

| | | | | |
|---|---|---|---|---|
| 6,516,309 | B1 * | 2/2003 | Eberhart | G06N 3/086 706/14 |
| 10,311,342 | B1 * | 6/2019 | Farhadi | G06F 18/24 |
| 11,295,195 | B2 * | 4/2022 | Park | G06F 7/523 |
| 12,106,197 | B2 * | 10/2024 | Qi | G06F 17/00 |
| 2016/0328643 | A1 * | 11/2016 | Liu | G06N 3/044 |
| 2017/0140273 | A1 * | 5/2017 | Sagher | G06N 3/045 |
| 2017/0337471 | A1 * | 11/2017 | Kadav | G06F 17/153 |
| 2019/0095464 | A1 * | 3/2019 | Xie | G06V 10/82 |
| 2019/0294929 | A1 * | 9/2019 | Yao | G06F 18/217 |
| 2020/0160144 | A1 * | 5/2020 | Gutfreund | G06N 3/045 |
| 2021/0012203 | A1 * | 1/2021 | Vishnu | G06N 3/09 |

(Continued)

OTHER PUBLICATIONS

Qian, Sheng, et al. "Adaptive activation functions in convolutional neural networks." Neurocomputing 272 (2018): 204-212. (Year: 2018).*

(Continued)

*Primary Examiner* — Alan S Miller

(57) ABSTRACT

The integration unit 26, using configuration information of the convolutional neural network model and each filter used in each convolutional layer of the convolutional neural network model as inputs, deletes one or more pieces of activation function processing performed between the plurality of convolutional layers and integrates a plurality of filters used in the plurality of convolutional layers.

8 Claims, 16 Drawing Sheets

(56) References Cited

U.S. PATENT DOCUMENTS

| | | | | |
|---|---|---|---|---|
| 2021/0182737 | A1* | 6/2021 | Lillestolen | G05B 17/02 |
| 2022/0222916 | A1* | 7/2022 | Namiki | G06V 10/772 |

OTHER PUBLICATIONS

Cho, Mannhee, and Youngmin Kim. "FPGA-based convolutional neural network accelerator with resource-optimized approximate multiply-accumulate unit." Electronics 10.22 (2021): 2859. (Year: 2021).*

Redmon et. al. (2018) "YOLOv3: An Incremental Improvement" arXiv:1804.02767v1 [online] website: <URL: https://arxiv.org/abs/1804.02767>.

Liu et. al. (2016) "SSD: Single Shot MultiBox Detector" arXiv:1512.02325v5 [online] website: <URL: https://arxiv.org/pdf/1512.02325.pdf>.

Ida et al. (2020) Model Compression for ResNet via Layer Erasure and Re-training Transactions of the Japanese Society for Artificial Intelligence vol. 35 No. 3C [online] website <URL: https://www.jstage.jst.go.jp/article/tjsai/35/3/35_C-JA3/_pdf/-char/ja>.

* cited by examiner

FIG.4

| INTEGRATION GROUP | LAYER NUMBER |
|---|---|
| 0 | 0, 1, 2 |
| 1 | 5, 6 |
| 2 | 10,11,12,13 |
| : | : |

MERGE DEVICE, MERGE METHOD, AND MERGE PROGRAM

CROSS-REFERENCE TO RELATED APPLICATIONS

This application is a U.S. National Stage Application filed under 35 U.S.C. § 371 claiming priority to International Patent Application No. PCT/JP2020/044520, filed on 30 Nov. 2020, the disclosure of which is hereby incorporated herein by reference in its entirety.

TECHNICAL FIELD

The technology of the present disclosure relates to an integration device, an integration method, and an integration program.

BACKGROUND ART

In recent years, research and development for efficiently processing inference processing in a convolutional neural network (CNN) have been actively conducted in order to apply image recognition or object recognition using the CNN to use cases such as surveillance cameras and drones for which real-time property, power saving, and area saving are required. Examples of the CNN model include You Only Look Once (YOLO) and Single Shot Multibox Detector (SSD) (Non Patent Literatures 1 and 2).

CITATION LIST

Non Patent Literature

Non Patent Literature 1: Joseph Redmon et. al, "YOLOv3: An Incremental Improvement", Internet <URL: https://arxiv.org/abs/1804.02767>

Non Patent Literature 2: Wei Liu et. al, "SSD: Single Shot MultiBox Detector", Internet <URL: https://arxiv.org/pdf/1512.02325.pdf>

Non Patent Literature 3: Model Compression for ResNet via Layer Erasure and Re-training, Internet <URL: https://www.jstage.jst.go.jp/article/tjsai/35/3/35_C-JA3/_pdf/-char/ja>

SUMMARY OF INVENTION

Technical Problem

The convolution operation occupies most of the operation in the CNN inference processing, and it is essential to efficiently process the convolution operation for the above purpose. FIG. 16 illustrates a model configuration of a general CNN. In a general configuration, a plurality of convolutional layers and an output layer are included, and convolution operation processing and activation function processing are a set in the convolutional layer. In the convolution operation processing, a product-sum operation of the value of the pixel of the input image and the value of the convolution filter is conducted. Hereinafter, the filter is referred to as one filter in units of three dimensions as illustrated in FIG. 16. Since the CNN model includes a large number of layers, there is a problem that the operation amount of the product-sum operation becomes enormous. As in Non Patent Literature 3, there is also provided a method of reducing the calculation amount of the convolution operation by paying attention to a structure specific to a certain model and deleting a layer having little influence on the accuracy, but there is a problem that the method lacks versatility.

The technology disclosed herein has been made in view of the above issues, and an object thereof is to provide an integration device, an integration method, and an integration program capable of reducing a calculation amount of a convolution operation in inference processing using a convolutional neural network model.

Solution to Problem

A first aspect of the present disclosure is an integration device that integrates a plurality of filters used in a plurality of convolutional layers of a convolutional neural network model for performing inference processing, including, an integration unit that, using configuration information of the convolutional neural network model and each of the filters used in each of the convolutional layers of the convolutional neural network model as inputs, deletes, one or more pieces of activation function processing performed between the plurality of convolutional layers and integrates the plurality of filters used in the plurality of convolutional layers.

A second aspect of the present disclosure is an integration method which is an integration method in an integration device that integrates a plurality of filters used in a plurality of convolutional layers of a convolutional neural network model for performing inference processing, the method comprising: using an integration unit, and using configuration information of the convolutional neural network model and each of the filters used in each of the convolutional layers of the convolutional neural network model as inputs, deleting one or more pieces of activation function processing performed between the plurality of convolutional layers and integrating the plurality of filters used in the plurality of convolutional layers.

A third aspect of the present disclosure is an integration program which is an integration program for integrating a plurality of filters used in a plurality of convolutional layers of a convolutional neural network model for performing inference processing, the integration program executable by a computer to perform processing including: using configuration information of the convolutional neural network model and each of the filters used in each of the convolutional layers of the convolutional neural network model as inputs, deleting one or more pieces of activation function processing performed between the plurality of convolutional layers and integrating the plurality of filters used in the plurality of convolutional layers.

Advantageous Effects of Invention

According to the technology disclosed, a calculation amount of a convolution operation in inference processing using a convolutional neural network model can be reduced.

BRIEF DESCRIPTION OF DRAWINGS

FIG. 4 is a block diagram illustrating a functional configuration of an integration device according to the first embodiment.

DESCRIPTION OF EMBODIMENTS

Figure 1:
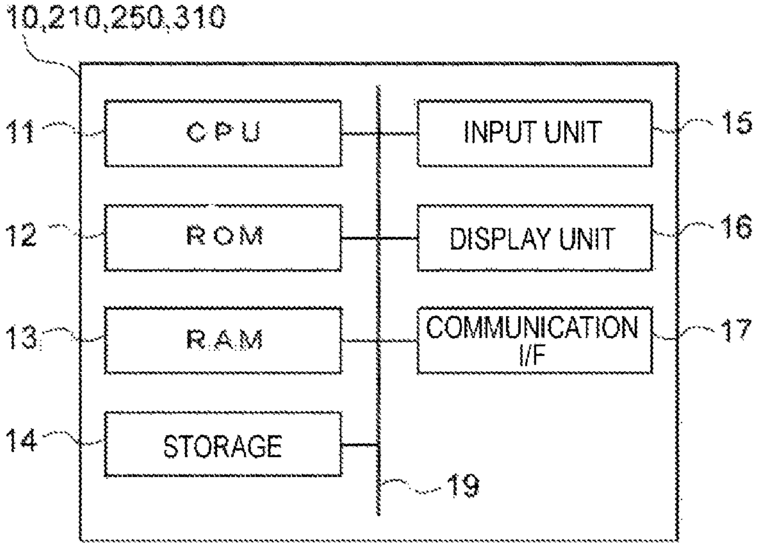
FIG. 1 is an image diagram for explaining a method of integrating convolutional layers.

Hereinafter, an example of an embodiment of the disclosed technology will be described with reference to the drawings. In the drawings, the same or equivalent constituents and portions are denoted by the same reference numerals. Further, dimensional ratios in the drawings are exaggerated for convenience of description and thus may be different from actual ratios.

Overview of Embodiments of Disclosed Technology

In the disclosed technology, a plurality of convolutional layers of a CNN model are integrated into one convolutional layer, thereby reducing the amount of calculation (see FIG. 1). FIG. 1 illustrates an example in which two pieces of linear convolution operation processing are integrated as one piece of linear convolution operation processing by deleting a non-linear activation function processing (activation function surrounded by a dotted line in FIG. 1) of a convolutional layer at a preceding stage of two consecutive convolutional layers.

In the deep learning including the CNN model, a configuration is adopted so that a nonlinear activation function is interposed after the linear operation of each layer. This is to make it possible to solve a problem that cannot be linearly separated, and if a non-linear activation function is not interposed, the linear operation of each layer can be expressed as one linear operation having the same value. This means that only a linearly separable problem can be solved no matter how many layers are stacked. Deep learning is a technique that makes it possible to solve more complicated separation problems by increasing the number of layers. Therefore, deleting the non-linear activation function reduces the number of layers, and the complexity of the problem to be solved is lowered. Therefore, there is a possibility that the accuracy is lowered in the inference processing. Therefore, in the disclosed technology, in order to reduce the calculation amount while maintaining the accuracy, for example, a combination of a convolutional layer that performs an operation using a convolution filter of size 1×1 that is considered to have little influence on the accuracy and a convolutional layer at a subsequent stage is set as an integration target, and the activation function of the convolutional layer using the convolution filter of size 1×1 is deleted. In this case, since a convolutional layer using a convolution filter of size 1×1 is used in various CNN models for the purpose of reducing the number of dimensions, many portions are applicable.

First Embodiment

Configuration of Integration Device According to First Embodiment

Figure 2:
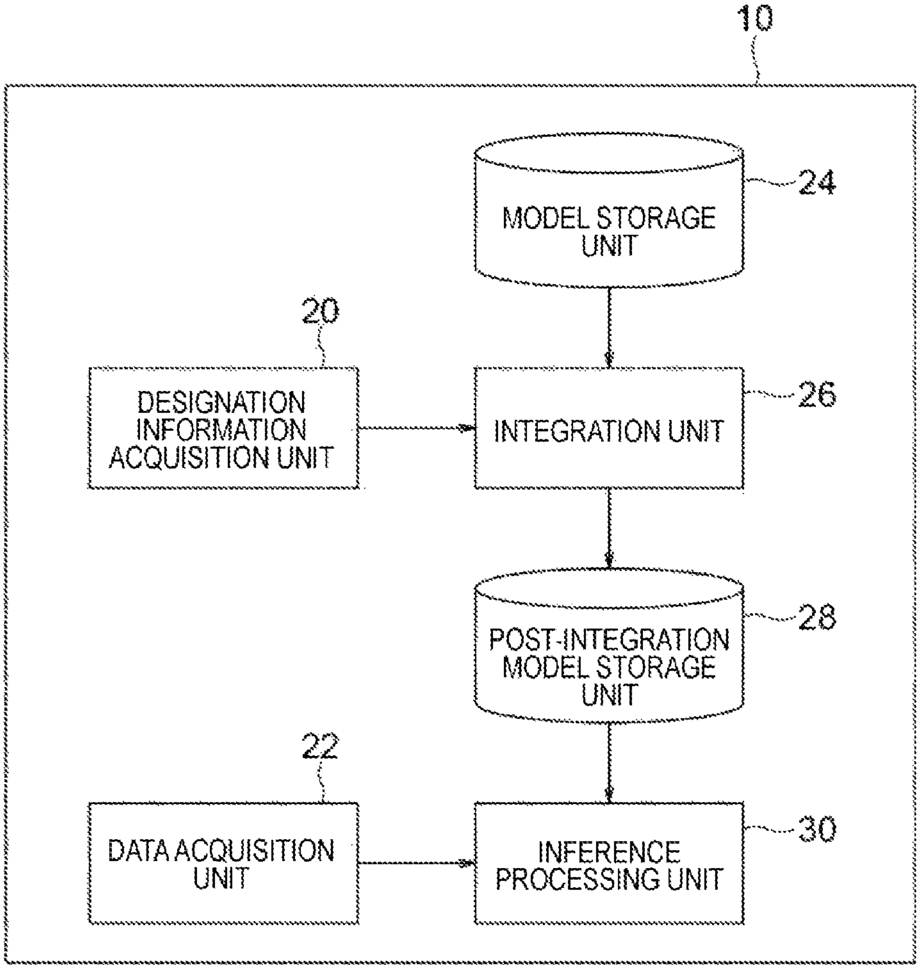
FIG. 2 is a schematic block diagram of an example of a computer functioning as an integration device and an inference device according to a first embodiment, a second embodiment, and a third embodiment.

FIG. 2 is a block diagram illustrating a hardware configuration of the integration device 10 according to the first embodiment.

As illustrated in FIG. 2, the integration device 10 includes a central processing unit (CPU) 11, a read only memory (ROM) 12, a random access memory (RAM) 13, a storage 14, an input unit 15, a display unit 16, and a communication interface (I/F) 17. The constituents are communicably connected to each other via a bus 19.

The CPU 11 is a central processing unit, and executes various programs and controls each unit. That is, the CPU 11 reads a program from the ROM 12 or the storage 14 and executes the program by using the RAM 13 as a work area. The CPU 11 controls each component described above and performs various types of operation processing according to the programs stored in the ROM 12 or the storage 14. In the present embodiment, the ROM 12 or the storage 14 stores an integration program for integrating convolutional layers of the CNN model. The integration program may be one program or a program group including a plurality of programs or modules.

The ROM 12 stores various programs and various types of data. The RAM 13 temporarily stores the programs or data as a work area. The storage 14 includes a hard disk drive (HDD) or a solid state drive (SSD) and stores various programs including an operating system and various types of data.

The input unit 15 includes a pointing device such as a mouse and a keyboard, and is used to perform various inputs.

Figure 3:
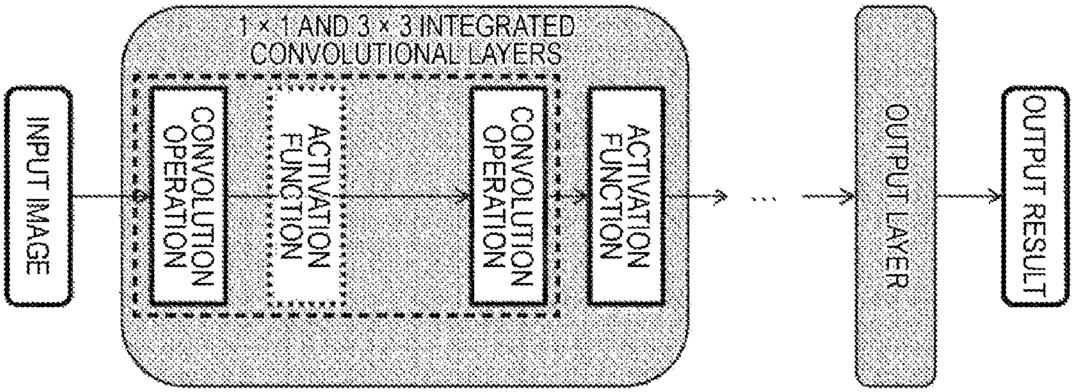
FIG. 3 is a diagram illustrating an example of designation information.

The input unit 15 receives, as an input, designation information for designating a combination of convolutional layers to be integrated in the CNN model. For example, as illustrated in FIG. 3, the input unit 15 receives, as an input, designation information for designating a layer number for each integration group that is a combination of convolutional layers to be integrated. For example, one integration group includes a convolutional layer using a filter of size 1×1 and a convolutional layer at a subsequent stage of the convolutional layer. In addition, an arbitrary number of layers can be integrated in one integration group, and an arbitrary number of integration groups can also be designated.

Furthermore, the input unit 15 receives data to be subjected to inference processing as an input. For example, the input unit 15 receives an input image that is subjected to the inference processing. Here, the input image may be a still image or a moving image.

The display unit 16 is, for example, a liquid crystal display, and displays various types of information including a result of the inference processing. The display unit 16 may function as the input unit 15 by adopting a touchscreen system.

The communication interface 17 is an interface for communicating with another device, and for example, standards such as Ethernet (registered trademark), FDDI, and Wi-Fi (registered trademark) are used.

Next, each functional configuration of the integration device 10 will be described. FIG. 4 is a block diagram illustrating an example of the functional configuration of the integration device 10.

The integration device 10 functionally includes a designation information acquisition unit 20, a data acquisition unit 22, a model storage unit 24, an integration unit 26, a post-integration model storage unit 28, and an inference processing unit 30 as illustrated in FIG. 4.

The designation information acquisition unit 20 acquires designation information that is input.

The data acquisition unit 22 acquires the input data to be subjected to the inference processing.

The model storage unit 24 stores configuration information of a CNN model before integration and a filter group used in each convolutional layer. Here, the configuration information includes an operation procedure and various parameters.

With the configuration information of the CNN model and each filter group used in each convolutional layer stored in the model storage unit 24 as inputs, the integration unit 26 deletes one or more pieces of activation function processing conducted between the plurality of convolutional layers, integrates the plurality of filters used in the plurality of convolutional layers, and outputs the configuration information of the CNN model after the integration and each filter group used in each convolutional layer.

Specifically, for each integration group indicated by the designation information, a plurality of filter groups used in a combination of a plurality of convolutional layers belonging to the integration group are integrated.

Figure 5:
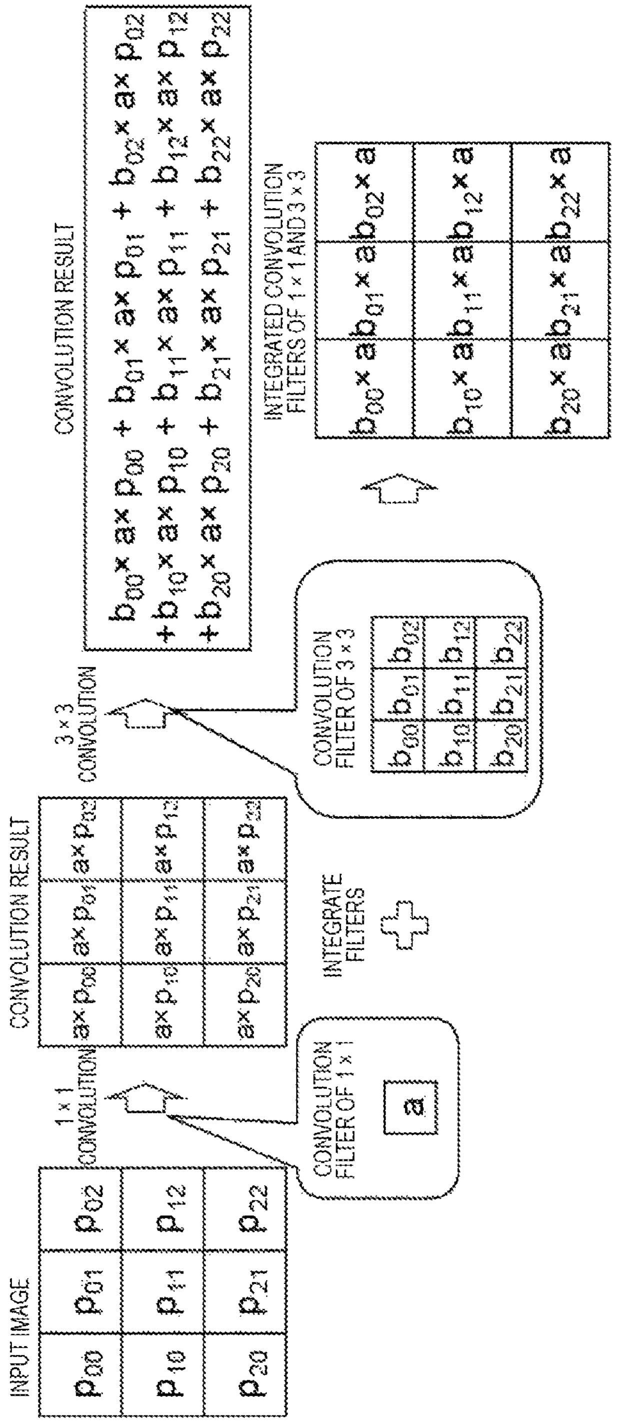
FIG. 5 is a diagram for explaining a method of integrating filters of a convolutional layer.
Figure 6:
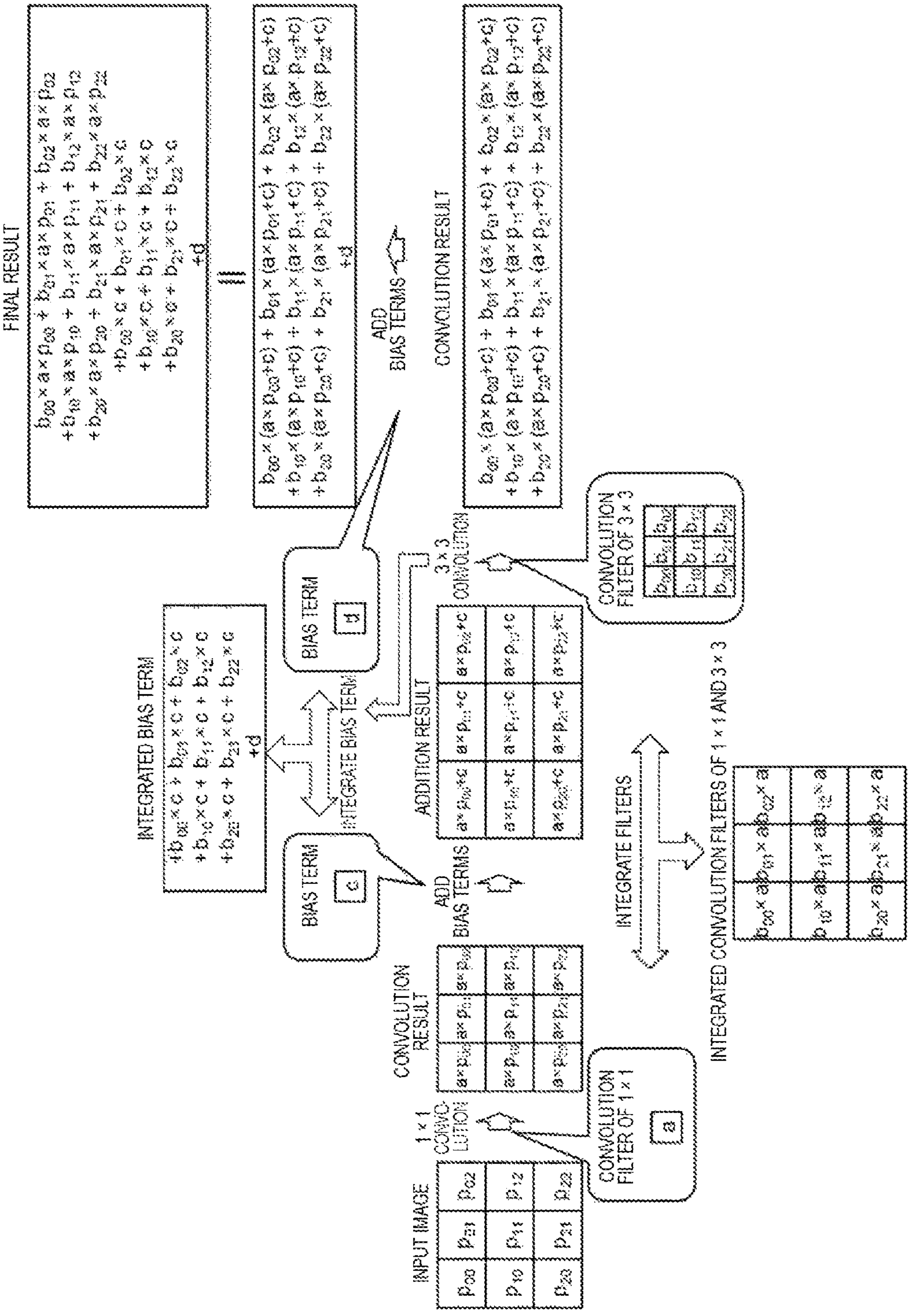
FIG. 6 is a diagram for explaining a method of integrating a bias term of a convolutional layer.

Here, since some CNN models add a bias term after convolution operation and before activation function processing, an integration example in a pattern without a bias term is illustrated in FIG. 5, and an integration example in a pattern with a bias term is illustrated in FIG. 6. Incidentally, in a case where there is a bias term, it is assumed that there is one bias term for one filter. For the sake of simplicity, a two-dimensional filter is used in FIGS. 5 and 6, but a three-dimensional filter may be used.

FIG. 5 illustrates an example of integrating a combination of a convolutional layer using a 1×1 filter and a convolutional layer using a 3×3 filter in a pattern without a bias term.

A result of performing a convolution operation on the input image in which the values of the pixels are $p_{00}$ to $p_{22}$ by using a 1×1 filter in which the value is a and then performing a convolution operation by using a 3×3 filter in which the values of the cells are $b_{00}$ to $b_{22}$ is expressed by the following expression (1).

$$(b_{00}\times a)\times p_{00}+(b_{01}\times a)\times p_{01}+(b_{02}\times a)\times p_{02}+ \quad (1)$$
$$(b_{10}\times a)\times p_{10}+(b_{11}\times a)\times p_{11}+(b_{12}\times a)\times p_{12}+$$

-continued $$(b_{20}\times a)\times p_{20}+(b_{21}\times a)\times p_{21}+(b_{22}\times a)\times p_{22}$$

By setting the value in parentheses in the above expression (1) as the value of each cell of the integrated filter, the 1×1 filter and the 3×3 filter can be integrated into one filter.

As can be seen from the above expression (1), by multiplying coefficients of two filters that are originally separate in advance as one new filter, multiplication in parentheses can be omitted during the inference processing. Although the example in which the 1×1 filter and the 3×3 filter are integrated has been described, the present invention is not limited thereto. It is possible to integrate filters of any size.

FIG. 6 illustrates an example of integrating a combination of a convolutional layer using a 1×1 filter and a convolutional layer using a 3×3 filter in a pattern with a bias term.

A result of performing a convolution operation on the input image in which the values of the pixels are $p_{00}$ to $p_{22}$ by using a 1×1 filter in which the value is a and then adding the bias term c and performing a convolution operation by using a 3×3 filter in which the values of the cells are $b_{00}$ to $b_{22}$ is expressed by the following expression (2).

$$b_{00}\times(a\times p_{00}+c)+b_{01}\times(a\times p_{01}+c)+b_{02}\times(a\times p_{02}+c)+ \quad (2)$$
$$b_{10}\times(a\times p_{10}+c)+b_{11}\times(a\times p_{11}+c)+b_{12}\times(a\times p_{12}+c)+$$
$$b_{20}\times(a\times p_{20}+c)+b_{21}\times(a\times p_{21}+c)+b_{22}\times(a\times p_{22}+c)$$

A result of adding the bias term d to the above expression (2) is expressed by the following expression (3).

$$b_{00}\times(a\times p_{00}+c)+b_{01}\times(a\times p_{01}+c)+b_{02}\times(a\times p_{02}+c)+ \quad (3)$$
$$b_{10}\times(a\times p_{10}+c)+b_{11}\times(a\times p_{11}+c)+b_{12}\times(a\times p_{12}+c)+$$
$$b_{20}\times(a\times p_{20}+c)+b_{21}\times(a\times p_{21}+c)+b_{22}\times(a\times p_{22}+c)+d$$

The above expression (3) is expressed by the following expression (4).

$$(b_{00}\times a)\times p_{00}+(b_{01}\times a)\times p_{01}+(b_{02}\times a)\times p_{02}+ \quad (4)$$
$$(b_{10}\times a)\times p_{10}+(b_{11}\times a)\times p_{11}+(b_{12}\times a)\times p_{12}+(b_{20}\times a)\times p_{20}+$$
$$(b_{21}\times a)\times p_{21}+(b_{22}\times a)\times p_{22}+b_{00}\times c+b_{01}\times c+b_{02}\times c+$$
$$b_{10}\times c+b_{11}\times c+b_{12}\times c+b_{20}\times c+b_{21}\times c+b_{22}\times c+d$$

Similarly to the pattern without a bias term, by setting the value in parentheses in the above expression (4) as the value of each cell of the integrated filter, the 1×1 filter and the 3×3 filter can be integrated into one filter.

In addition, the following expression (5) can be used as an integrated bias term.

$$+b_{00}\times c+b_{01}\times c+b_{02}\times c+b_{10}\times c+ \quad (5)$$
$$b_{11}\times c+b_{12}\times c+b_{20}\times c+b_{21}\times c+b_{22}\times c+d$$

As can be seen from the above expression (5), by setting the sum of the bias term of the convolutional layer of the subsequent stage and the product sum of the coefficient of the filter of the convolutional layer of the subsequent stage and the value of the bias term of the convolutional layer of the preceding stage as a new bias term, it is possible to omit the product-sum operation of the integrated bias term at the time of the inference processing.

Next, a specific method of determining the value of each cell of the integrated filter will be described.

First, each cell of the integrated filter is set as a target cell. Then, the input data for integration is prepared in which the height is the height of the integrated filter, the width is the width of the integrated filter, and the number of channels is the number of channels of the filter of the first-stage convolutional layer to be integrated, and the value of only the cell at the same position as the target cell is set to one and the values of the other cells are set to zero.

Figure 7:
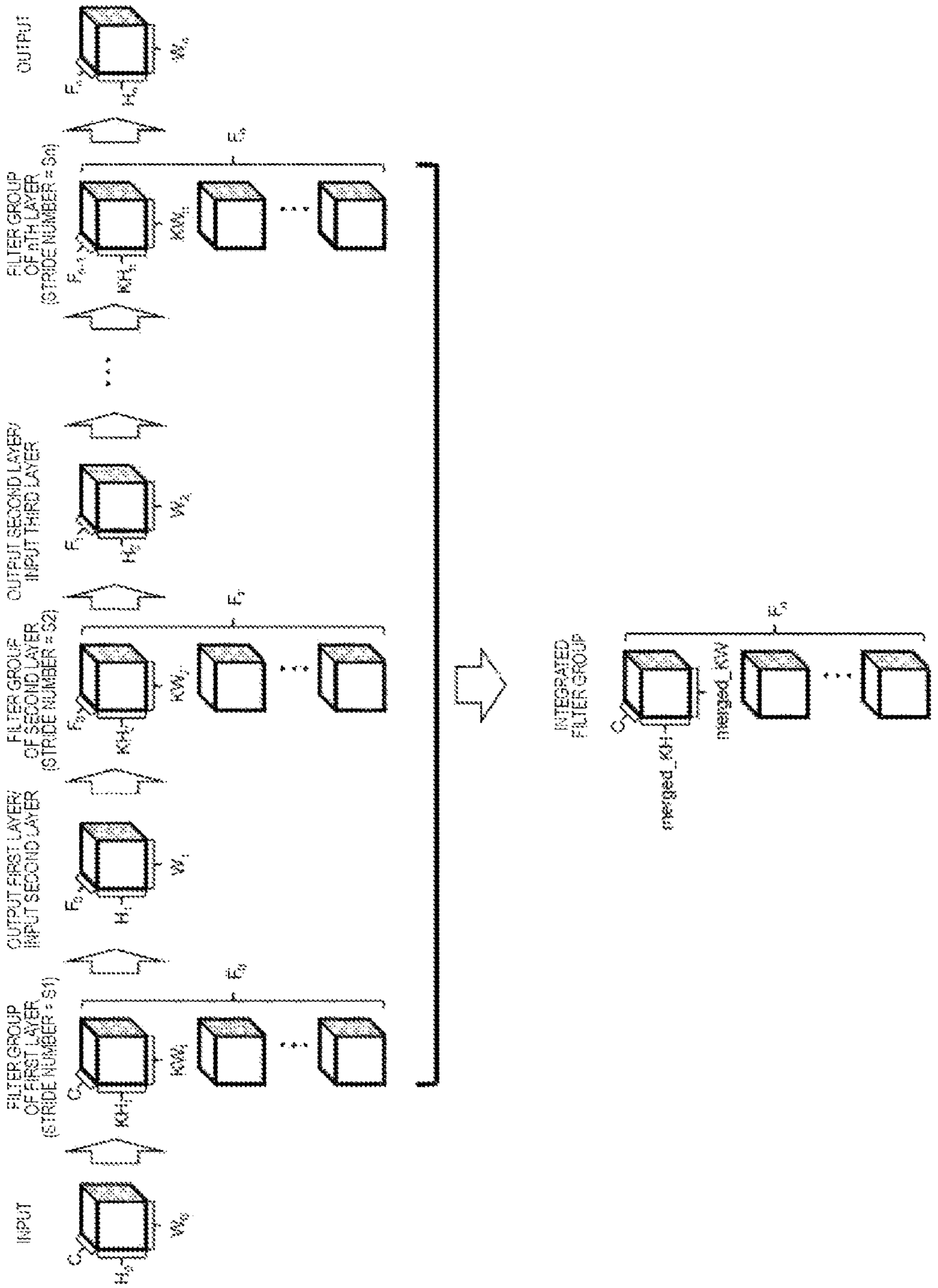
FIG. 7 is a diagram for explaining a method of calculating a size of an integrated filter group.

Here, FIG. 7 illustrates a method of obtaining the size (width and height) and the number of filters of the integrated filter. First, the number of filters of the integrated filter group coincides with the number of filters $F_n$ of the final layer (nth) in the convolutional layer to be integrated. The height merged_KH of the integrated filter can be obtained based on the following equation (6).

$$\text{merged\_KH} = \text{Merged\_KH}(1) \tag{6}$$

$$\text{Merged\_KH}(i) = \begin{cases} KH_i + (\text{Merged\_KH}(i+1) - 1)^* S_i & (\text{where } i = 1 \text{ to } n-1) \\ KH_n \ (\text{where } i = n) \end{cases}$$

The height merged_KW of the integrated filter can be obtained based on the following equation (7).

$$\text{merged\_KW} = \text{Merged\_KW}(1) \tag{7}$$

$$\text{Merged\_KW}(i) = \begin{cases} KW_i + (\text{Merged\_KW}(i+1) - 1)^* S_i & (\text{where } i = 1 \text{ to } n-1) \\ KW_n \ (\text{where } i = n) \end{cases}$$

However, Merged_KH(i) and Merged_KW(i) are recursive functions, and where i=n, the height and width of the filter of the nth layer are returned. Where i=1 to n−1, Merged_KH(i) returns a value based on the height of the filter of the ith layer, the stride number, and the result of Merged_KH(i−1). Where i=1 to n−1, Merged_KW(i) returns a value based on the width of the filter of the ith layer, the stride number, and the result of Merged_KW(i−1).

In addition, the number of integrated bias terms coincides with the number of integrated filters. This is because there is one bias term for one filter.

Figure 8:
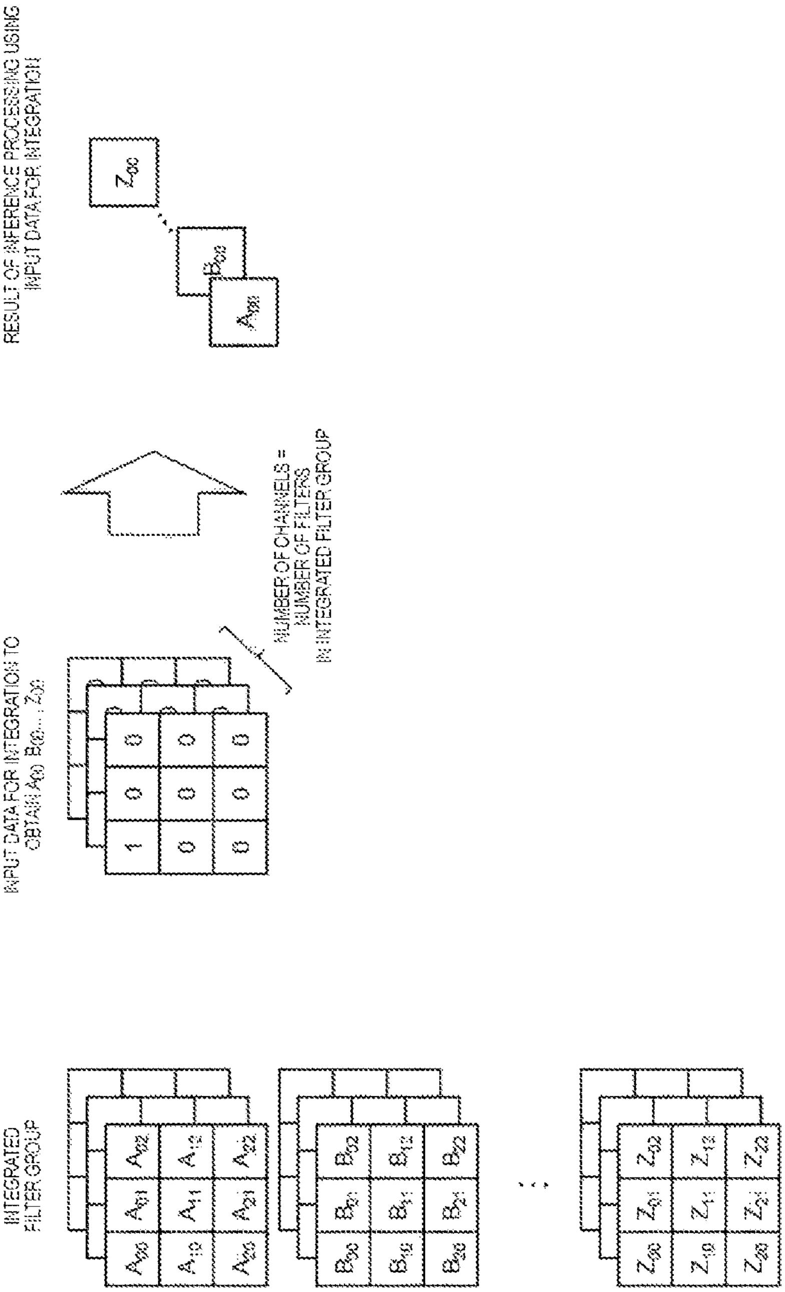
FIG. 8 is a diagram for explaining a method of integrating filters of a convolutional layer.

FIG. 8 illustrates an example of the input data for integration. In the input data for integration, only the cell at the same position (height, width, and channel) as the cell for which the value of the integrated filter is desired to be obtained is set to "1", and the other cells are set to "0".

Then, a combination of convolutional layers to be integrated is extracted from the CNN model, and a partial model in which all bias terms are set to zero is generated. Then, inference processing is performed on the input data for integration by using the partial model, and the value of the ith channel of the result of the inference processing is set as the value of the target cell of the ith filter in the integrated filters.

For example, the inference result is data of "height=1, width=1, and number of channels=number of filters in integrated filter group", but the value of the ith channel is the value of the ith filter in the integrated filter group.

All the values of the integrated filter group are determined by repeatedly performing the above processing on all the cells of the integrated filters of all the integrated groups.

Next, a specific method of determining the value of an integrated bias term will be described.

Figure 9:
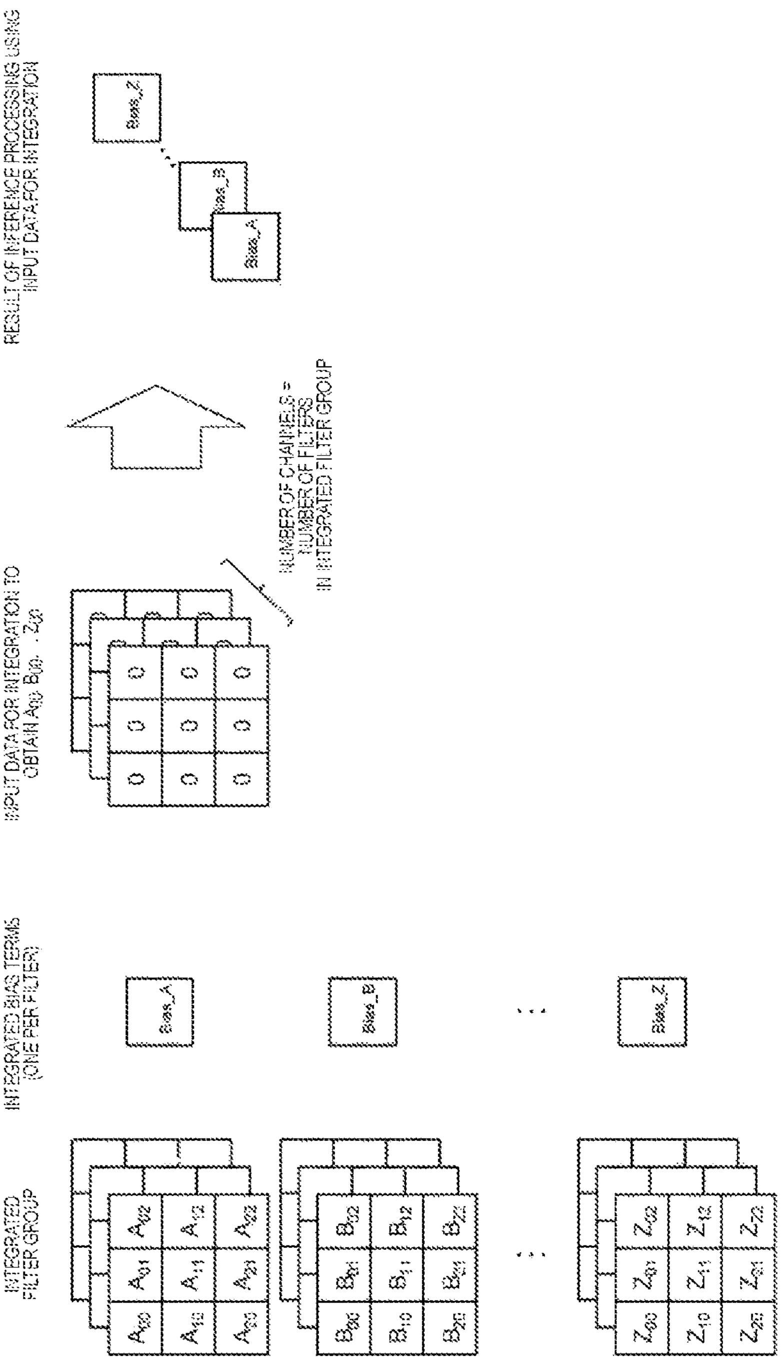
FIG. 9 is a diagram for explaining a method of integrating a bias term of a convolutional layer.

First, the input data for integration is prepared in which the height is the height of the integrated filter, the width is the width of the integrated filter, and the number of channels is the number of channels of the filter of the first-stage convolutional layer to be integrated, and the all values are set to zero (see FIG. 9).

Then, a combination of convolutional layers to be integrated is extracted from the CNN model, and a partial model is generated. At that time, the bias term remains original. Then, inference processing is performed on the input data for integration by using the partial model.

The value of the bias term of each of the integrated filters is determined by setting the value of the ith channel of the result of the inference processing as the value of the bias term of the ith filter in the integrated filters.

For example, the inference result is data of "height=1, width=1, and number of channels=number of filters in integrated filter group", but the value of the ith channel is the value of the ith bias term in the integrated filter group.

By performing the above processing on all the integration groups, it is possible to obtain the values of all the bias terms after integration.

The post-integration model storage unit 28 stores the configuration information of the CNN model in a state where the convolutional layers are integrated by the integration unit 26 and the filter group used in each convolutional layer.

The inference processing unit 30 performs inference processing on the input image using the configuration information of the CNN model stored in the post-integration model storage unit 28 and the filter group used in each convolutional layer, and outputs an inference result by the display unit 16.

Operation of Integration Device According to First Embodiment

Next, an operation of the integration device 10 according to the first embodiment will be described.

Figure 10:
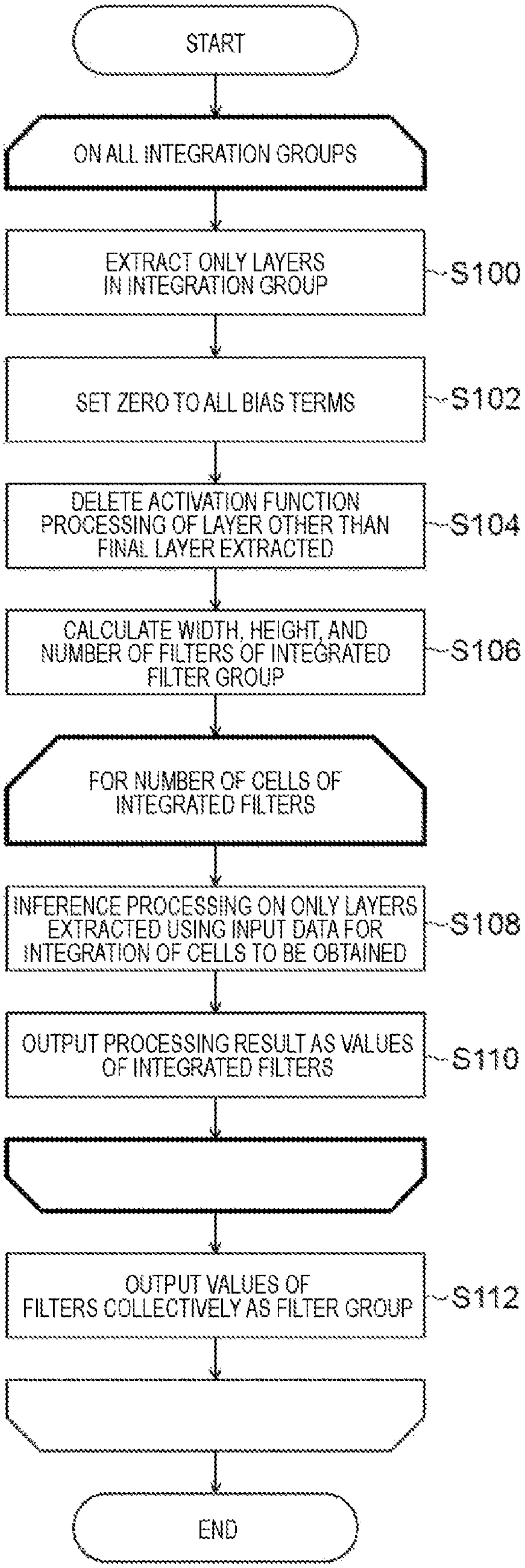
FIG. 10 is a flowchart illustrating a procedure of processing of integrating filters in integration processing of the first embodiment.
Figure 11:
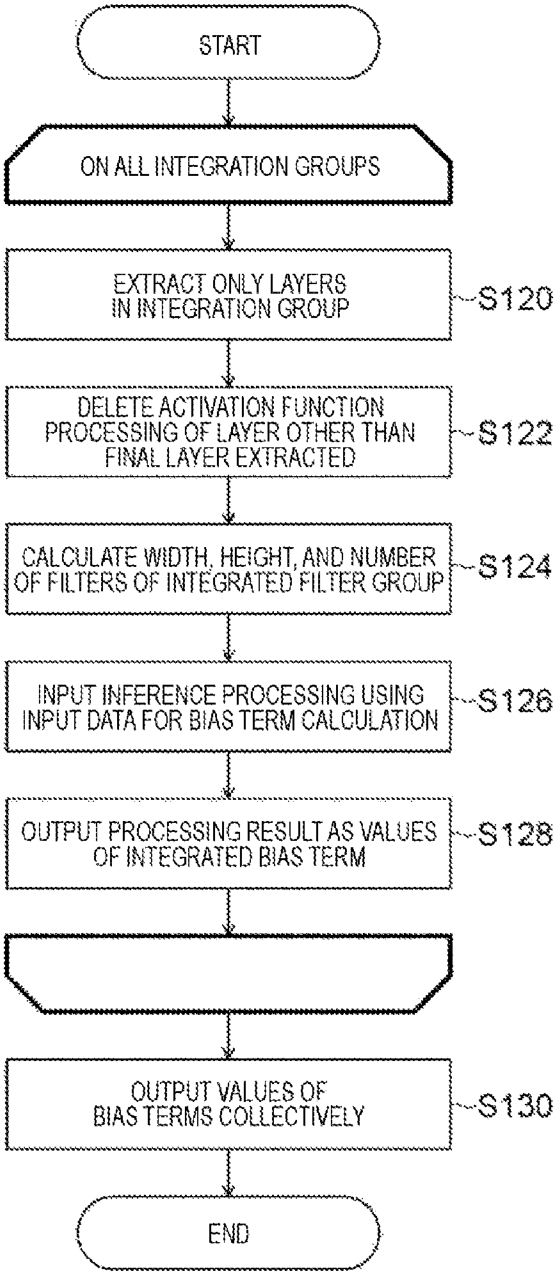
FIG. 11 is a flowchart illustrating a procedure of processing of integrating bias terms in the integration processing of the first embodiment.

FIG. 10 is a flowchart illustrating a procedure of processing of integrating filters in integration processing by the integration device 10. FIG. 11 is a flowchart illustrating a procedure of processing of integrating bias terms in the integration processing by the integration device 10. Integration processing is performed by the CPU 11 reading an integration program from the ROM 12 or the storage 14, developing the integration program in the RAM 13, and executing the integration program. In addition, designation information is input to the integration device 10.

Steps S100 to S112 are repeated with each of all the integration groups indicated by the designation information as a target integration group.

In step S100, the CPU 11 generates, as the integration unit 26, a partial model obtained by extracting the combination of convolutional layers included in the target integration group from the CNN model.

In step S102, the CPU 11, as the integration unit 26, sets zero to all the bias terms of the partial model generated in step S100.

In step S104, the CPU 11, as the integration unit 26, deletes the activation function processing of each convolutional layer other than the final layer of the partial model.

In step S106, the CPU 11, as the integration unit 26, calculates the width and height of each filter of the integrated filter group and the number of filters of the integrated filter group.

Steps S108 to S110 are repeated with each cell of the integrated filter as a target cell.

In step S108, the CPU 11 prepares input data for integration as the integration unit 26. In the input data for integration, only the cell at the same position (height, width, and channel) as the target cell is set to "1", and the other cells are set to "0". Then, the CPU 11 performs inference processing using the input data for integration and the partial model.

In step S110, the CPU 11 sets, as the integration unit 26, the value of the ith channel obtained from the data of "height=1, width=1, and number of channels=number of filters in integrated filter group" which is the inference result as the value of the target cell of the ith filter in the integrated filter group.

In step S112, the CPU 11 stores, as the integration unit 26, the integrated filter group for the target integration group in the post-integration model storage unit 28.

Then, steps S120 to S128 are repeated with each of all the integration groups indicated by the designation information as a target integration group.

In step S120, the CPU 11 generates, as the integration unit 26, a partial model obtained by extracting the combination of convolutional layers included in the target integration group from the CNN model.

In step S122, the CPU 11, as the integration unit 26, deletes the activation function processing of each convolutional layer other than the final layer of the partial model.

In step S124, the CPU 11, as the integration unit 26, calculates the width and height of each filter of the integrated filter group and the number of filters of the integrated filter group.

In step S126, the CPU 11 prepares input data for integration as the integration unit 26. In the input data for integration, all values are set to zero. Then, the CPU 11 performs inference processing using the input data for integration and the partial model.

In step S128, the CPU 11 sets, as the integration unit 26, the value of the ith channel obtained from the data of "height=1, width=1, and number of channels=number of filters in integrated filter group" which is the inference result as the value of the bias term of the ith filter in the integrated filter group.

In step S130, the CPU 11 stores, as the integration unit 26, the value of the bias term of the integrated filter group for each integration group in the post-integration model storage unit 28.

Then, w % ben data to be inferred is input to the integration device 10, the integration device 10 applies the integrated CNN model including the integrated filter group and the bias term for each integration group to the data to be inferred, and performs inference processing. The integration device 10 displays the result of the inference processing using the display unit 16.

As described above, the integration device according to the first embodiment deletes one or more pieces of activation function processing performed between the plurality of convolutional layers, and integrates the plurality of filters used in the plurality of convolutional layers. As a result, the calculation amount of the convolution operation in the CNN inference processing can be reduced, and the CNN inference processing performance can be improved.

Second Embodiment

The second embodiment is different from the first embodiment in that an integration device and an inference device are configured as separate devices.

Configuration of Integration Device According to Second Embodiment

An integration device of a second embodiment will be described. Note that parts having configurations similar to those of the first embodiment are denoted by the same reference numerals, and description thereof is omitted.

The hardware configuration of the integration device 210 of the second embodiment is similar to the hardware configuration of the integration device 10 illustrated in FIG. 2 described above.

The input unit 15 receives, as an input, designation information for designating a combination of convolutional layers to be integrated in the CNN model.

Figure 12:
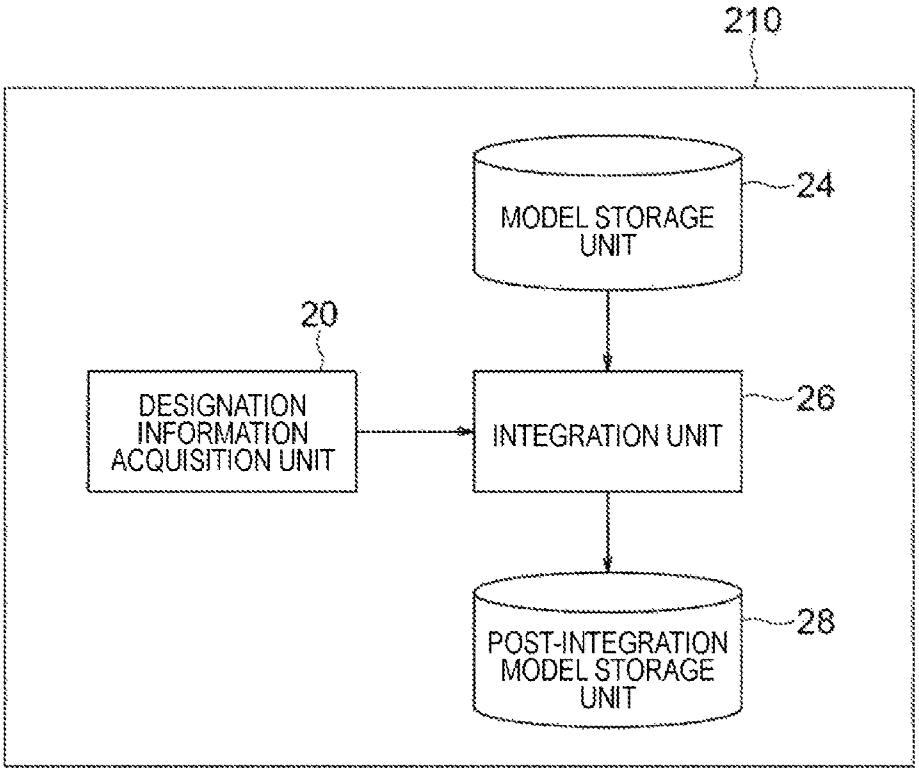
FIG. 12 is a block diagram illustrating a functional configuration of an integration device according to the second embodiment.

Next, each functional configuration of the integration device 210 will be described. FIG. 12 is a block diagram illustrating an example of the functional configuration of the integration device 210.

The integration device 210 functionally includes a designation information acquisition unit 20, a model storage unit 24, an integration unit 26, and a post-integration model storage unit 28 as illustrated in FIG. 12.

Configuration of Inference Device According to Second Embodiment

Next, an inference device of the second embodiment will be described. Note that parts having configurations similar to those of the first embodiment are denoted by the same reference numerals, and description thereof is omitted.

The hardware configuration of the inference device 250 of the second embodiment is similar to the hardware configuration of the integration device 10 illustrated in FIG. 2 described above.

The input unit 15 receives target data to be subjected to be inferred as an input. Specifically, the input unit 15 receives the input image as the target data.

Figure 13:
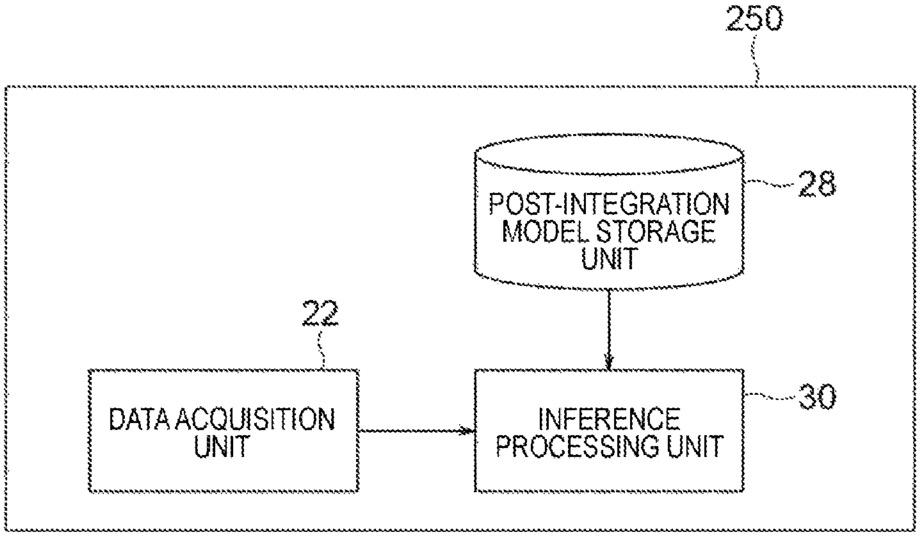
FIG. 13 is a block diagram illustrating a functional configuration of an inference device according to the second embodiment.

Next, each functional configuration of the inference device 250 will be described. FIG. 13 is a block diagram illustrating an example of the functional configuration of the inference device 250.

The inference device 250 functionally includes a data acquisition unit 22, a post-integration model storage unit 28, and an inference processing unit 30 as illustrated in FIG. 13.

Note that other configurations and operations of the integration device 210 and the inference device 250 according to the second embodiment are similar to those of the first embodiment, and thus, description thereof is omitted.

Third Embodiment

Overview of Third Embodiment

The third embodiment is different from the first embodiment and the second embodiment in that a combination of convolutional layers to be integrated that provides target performance and achieves the target performance is searched for instead of externally providing a combination of convolutional layers to be integrated.

The configuration information of the CNN model of the calculation amount reduction target and the filter group of the convolutional layer are used as inputs, and the convolutional layer is integrated so as to achieve a given target value (accuracy, processing performance, power consumption, and the like). In the integration of the convolutional layer, it is possible to integrate an arbitrary number of operations and an arbitrary filter size. As the number of convolutional layers to be integrated increases, the amount of calculation is reduced, but the number of activation functions to be deleted increases, leading to deterioration of inference accuracy. In the present embodiment, performance measurement is performed each time while increasing or changing a convolutional layer to be integrated on the basis of an image for performance measurement, and if target performance is achieved, configuration information of a CNN model and a filter group after integration at that time are output. If the target performance is not achieved, the configuration information and the filter group of the CNN model after the integration having the best performance are output.

Configuration of Integration Device According to Third Embodiment

An integration device of a third embodiment will be described. Note that parts having configurations similar to those of the first embodiment are denoted by the same reference numerals, and description thereof is omitted.

The hardware configuration of the integration device 310 of the third embodiment is similar to the hardware configuration of the integration device 10 illustrated in FIG. 2 described above.

The input unit 15 receives the target performance as an input. The target performance is a performance value related to accuracy, processing performance, power consumption, or the like, and is, for example, an improvement value compared with the performance of the inference processing of the CNN model before integration.

The input unit 15 receives performance measurement data as an input. For example, the input unit 15 receives an input image for performance measurement. Furthermore, in a case where accuracy is included in the target performance, the input unit 15 further receives an inference result of a correct answer for the performance measurement data as an input.

Figure 14:
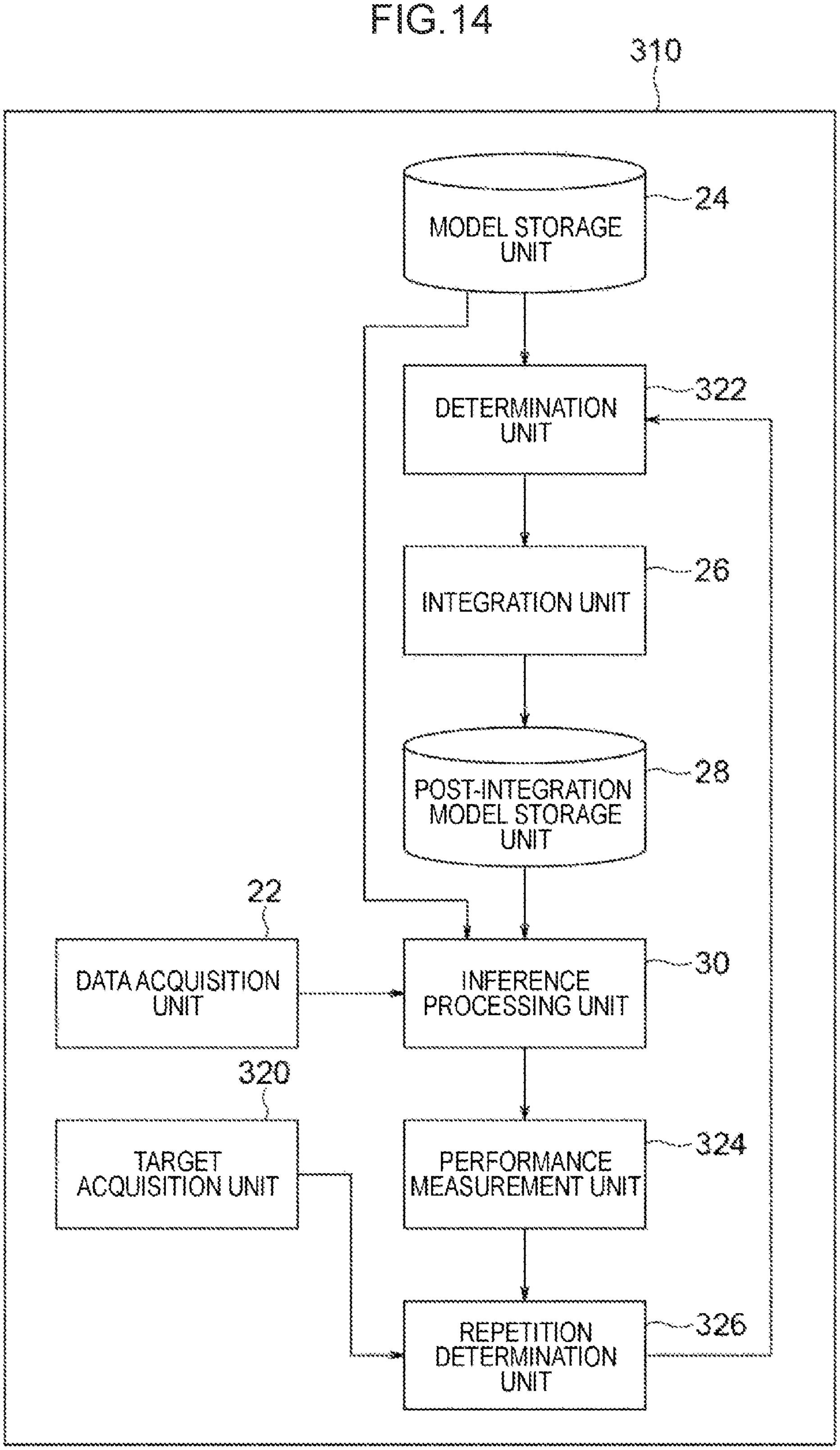
FIG. 14 is a block diagram illustrating a functional configuration of an integration device according to the third embodiment.

Next, functional configuration of the integration device 310 will be described. FIG. 14 is a block diagram illustrating an example of the functional configuration of the integration device 310.

The integration device 310 functionally includes a target acquisition unit 320, a data acquisition unit 22, a model storage unit 24, a selection unit 322, an integration unit 26, a post-integration model storage unit 28, an inference processing unit 30, a performance measurement unit 324, and a repetition determination unit 326 as illustrated in FIG. 14.

The target acquisition unit 320 acquires target performance that is input.

The data acquisition unit 22 acquires the input performance measurement data.

The selection unit 322 repeatedly selects a combination of a plurality of convolutional layers to be integrated. Specifically, the selection unit 322 repeatedly selects a combination of a plurality of convolutional layers to be integrated while increasing the number of convolutional layers. For example, the selection unit 322 repeatedly selects each of all combinations of two consecutive convolutional layers until the combination is selected as a combination of convolutional layers to be integrated, and then repeatedly selects each of all combinations of three consecutive convolutional layers until the combination is selected as a combination of convolutional layers to be integrated.

The integration unit 26 integrates a plurality of filters used in a combination of a plurality of convolutional layers selected by the selection unit 322, in a similar manner of the first embodiment described above.

The inference processing unit 30 performs inference processing on the performance measurement data using the CNN model before integration by the integration unit 26.

The inference processing unit 30 performs an inference processing on the performance measurement data using the CNN model obtained as a result of integrating by the integration unit 26 a plurality of filters used in the combination of the plurality of convolutional layers selected by the selection unit 322.

The performance measurement unit 324 measures the performance of the inference processing by the inference processing unit 30 using the CNN model before the integration by the integration unit 26. Further, the performance measurement unit 324 measures the performance of the inference processing by the inference processing unit 30 using the CNN model after the integration by the integration unit 26.

In a case where the target performance is accuracy, in the performance measurement of the inference processing, the accuracy of the inference processing by the inference processing unit 30 is measured by comparing the inference result of the correct answer with the result of the inference processing.

Furthermore, in a case where the target performance is power consumption, in the performance measurement of the inference processing, power consumption is measured from the start to the end of the inference processing by the inference processing unit 30.

The repetition determination unit 326 repeats each processing of the selection unit 322, the integration unit 26, the inference processing unit 30, and the performance measurement unit 324 until a predetermined repetition end condition is satisfied.

Here, as the repetition end condition, for example, a condition that a given target performance has been achieved, a condition that a predetermined upper limit number of repetitions has been reached, or the like may be used.

The repetition determination unit 326 outputs the configuration information of the CNN model and the filter group as a result of integration by the integration unit 26 when the performance measured by the performance measurement unit 324 has achieved a given target performance. In a case where the performance measured by the performance measurement unit 324 does not achieve the given target performance, the repetition determination unit 326 outputs the configuration information of the CNN model and the filter group as a result of the integration performed by the integration unit 26 when the performance measured by the performance measurement unit 324 is the highest.

Operation of Integration Device According to Third Embodiment

Next, an operation of the integration device 310 according to the third embodiment will be described.

Figure 15:
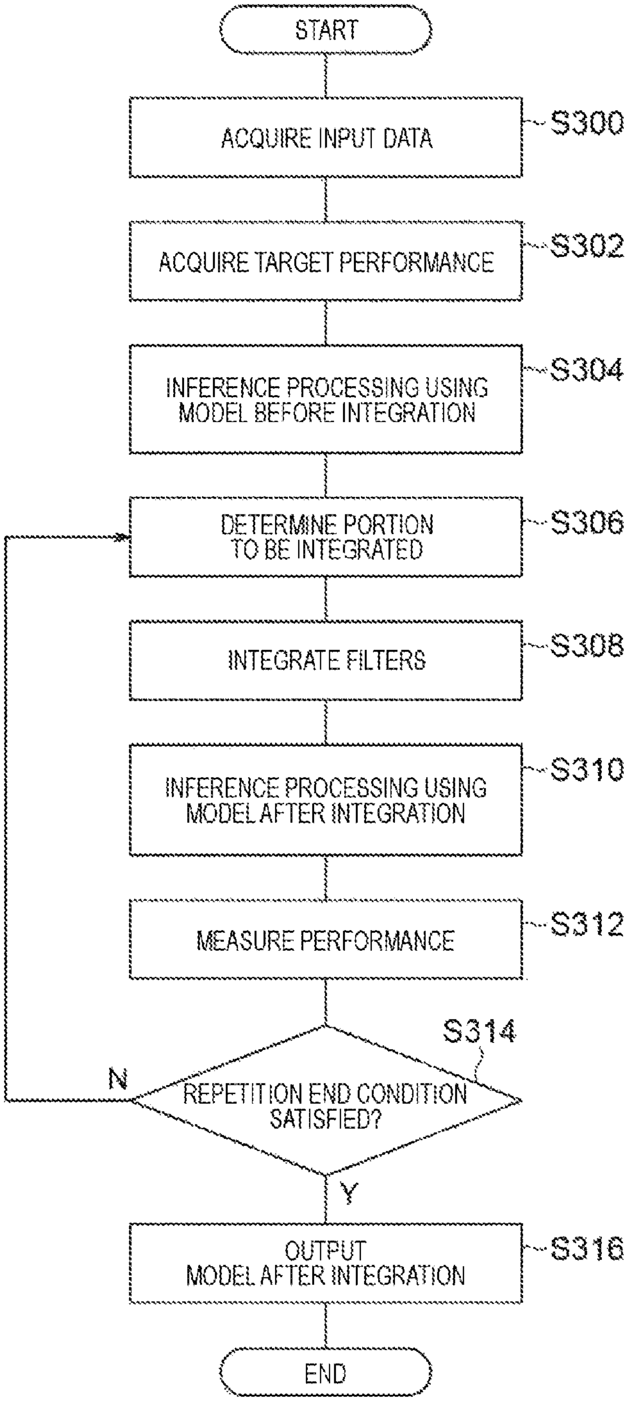
FIG. 15 is a flowchart illustrating a procedure of integration processing of the third embodiment.
Figure 16:
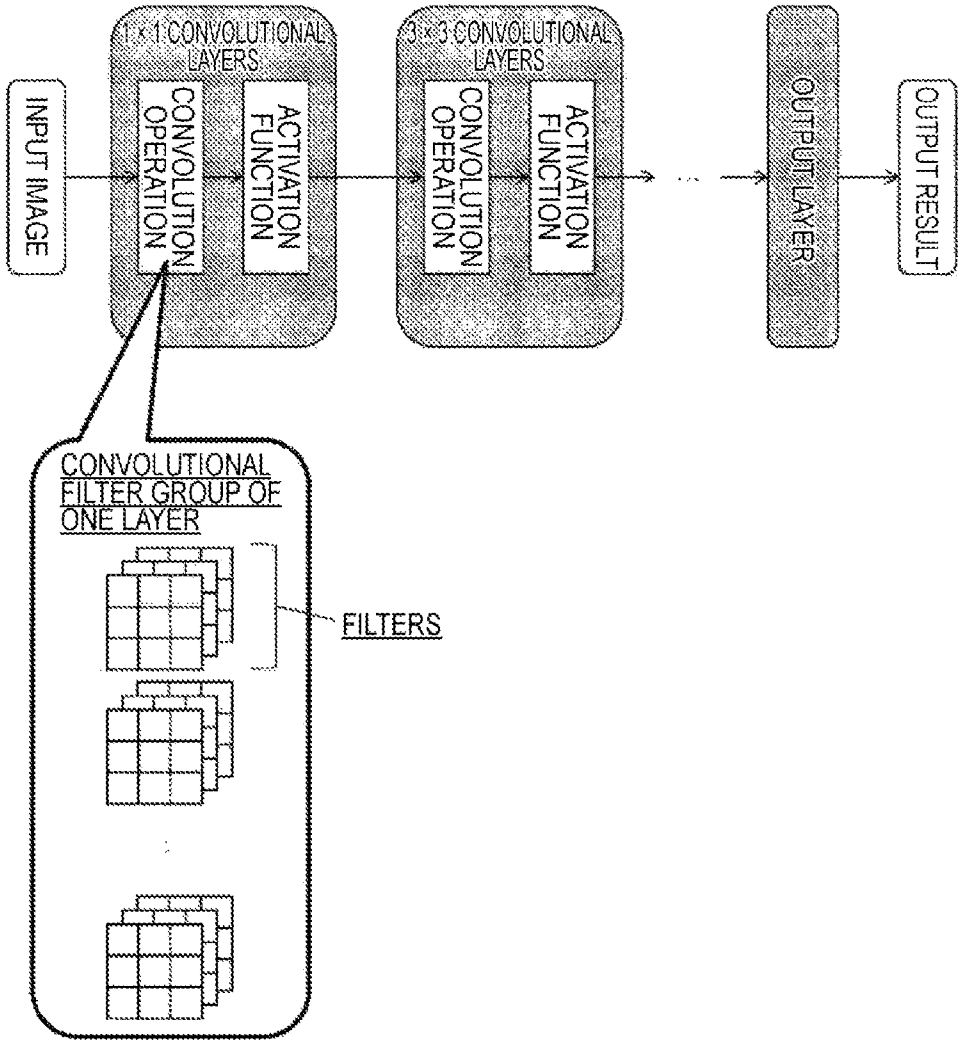
FIG. 16 is a diagram illustrating an example of a general convolutional neural network model.

FIG. 15 is a flowchart illustrating a procedure of integration processing by the integration device 310. Integration processing is performed by the CPU 11 reading an integration program from the ROM 12 or the storage 14, developing the integration program in the RAM 13, and executing the integration program. In addition, target performance and performance measurement data are input to the integration device 310.

In step S300, the CPU 11 acquires the input performance measurement data as the data acquisition unit 22.

In step S302, the CPU 11 acquires the input target performance as the target acquisition unit 320.

In step S304, the CPU 11 performs, as the inference processing unit 30, inference processing on the performance measurement data using the CNN model before integration by the integration unit 26.

In step S305, the CPU 11 measures, as the performance measurement unit 324, the performance of the inference processing by the inference processing unit 30 using the CNN model before the integration by the integration unit 26.

In step S306, the CPU 11 selects, as the selection unit 322, a combination of a plurality of convolutional layers to be integrated.

In step S308, the CPU 11 integrates, as the integration unit 26, a plurality of filters used in a combination of a plurality of convolutional layers selected by the selection unit 322. Specifically, processing similar to the processing routine illustrated in FIGS. 10 and 11 is performed with the combination of the plurality of convolutional layers selected by the selection unit 322 as the target integration group.

In step S310, the CPU 11 performs, as the inference processing unit 30, an inference processing on the performance measurement data using the CNN model obtained as a result of integrating by the integration unit 26 a plurality of filters used in the combination of the plurality of convolutional layers selected by the selection unit 322.

In step S312, the CPU 11 measures, as the performance measurement unit 324, the performance of the inference processing by the inference processing unit 30 using the CNN model after the integration by the integration unit 26.

In step S314, the CPU 11 determines, as the repetition determination unit 326, whether a predetermined repetition end condition is satisfied or not. In a case where the repetition end condition is not satisfied, the process returns to step S306 described above. On the other hand, in a case where the repetition end condition is satisfied, the process proceeds to step S316.

In step S316, the CPU 11 outputs, as the repetition determination unit 326, the configuration information of the CNN model and the filter group as a result of integration by the integration unit 26 when the performance measured by the performance measurement unit 324 has achieved a given target performance. In a case where the performance measured by the performance measurement unit 324 does not achieve the given target performance, the CPU 11 outputs, as the repetition determination unit 326, the configuration information of the CNN model and the filter group as a result of the integration performed by the integration unit 26 when the performance measured by the performance measurement unit 324 is the highest. Then, the CPU 11 terminates the integration processing.

As described above, the integration device according to the third embodiment outputs the CNN model obtained as a result of integration performed by the integration unit when measured performance achieves a given target performance. As a result, the CNN inference processing performance can be set as the target performance, and the calculation amount of the convolution operation in the CNN inference processing can be reduced.

Note that the present invention is not limited to the device configuration and operation of the above-described embodiments, and various modifications and applications can be made without departing from the gist of the present invention.

For example, various kinds of processing that is executed by the CPU reading software (program) in the above embodiment may be executed by various processors other than the CPU. Examples of the processor in this case include a programmable logic device (PLD) in which a circuit configuration can be changed after manufacturing such as a field-programmable gate array (FPGA), and a dedicated electric circuit that is a processor having a circuit configuration exclusively designed for performing specific processing such as an application specific integrated circuit (ASIC). Further, the integration processing may be executed by one of the various processors or may be executed by a combination of two or more processors of the same type or different types (e.g. a combination of a plurality of FPGAs or a combination of a CPU and an FPGA). Furthermore, a hardware structure of the various processors is, more specifically, an electric circuit in which circuit elements such as semiconductor elements are combined.

In each embodiment described above, the aspect in which the integration program is stored (installed) in advance in the storage 14 has been described, but this is not restrictive. The program may be provided by being stored in a non-transitory storage medium such as a compact disk read only memory (CD-ROM), a digital versatile disk read only memory (DVD-ROM), and a universal serial bus (USB) memory. The program may be downloaded from an external device via a network.

In addition, in each of the above embodiments, the case where inference processing for an image is performed has been described as an example, but this is not restrictive. The processing may be inference processing for data other than images.

In addition, the case where the convolutional layer that performs the operation using the convolution filter of size 1×1 and the convolutional layer at the subsequent stage are to be integrated has been described as an example, but the present invention is not limited thereto. For example, a convolutional layer using a filter of size 1×1 and a convolutional layer at a preceding stage of the convolutional layer may be an integration target, or a combination of a plurality of convolutional layers using filters of other sizes may be an integration target.

In addition, the case where the value of each cell of each filter of the integrated filter group is obtained by the processing routine illustrated in FIG. 10 has been described as an example, but the present invention is not limited thereto. For example, the value of each cell of each filter of the integrated filter group may be analytically obtained using an expression deformation as in the above expression (1).

In addition, the case where the value of the bias term of each filter of the integrated filter group is obtained by the processing routine illustrated in FIG. 11 has been described as an example, but the present invention is not limited thereto. For example, the value of the bias term of each filter of the integrated filter group may be analytically obtained using an expression deformation as in the above expressions (3) to (5).

Regarding the above embodiment, the following supplementary notes are further disclosed.

(Supplementary Note 1)

An integration device that integrates a plurality of filters used in a plurality of convolutional layers of a convolutional neural network model for performing inference processing, the integration device including:

a memory; and at least one processor connected to the memory, in which the processor, using configuration information of the convolutional neural network model and each of the filters used in each of the convolutional layers of the convolutional neural network model as inputs, deletes one or more pieces of activation function processing performed between the plurality of convolutional layers and integrates the plurality of filters used in the plurality of convolutional layers.

(Supplementary Note 2)

A non-transitory storage medium storing a program that can be executed by a computer to execute integration processing of integrating a plurality of filters used in a plurality of convolutional layers of a convolutional neural network model for performing inference processing, in which the integration processing, using configuration information of the convolutional neural network model and each of the filters used in each of the convolutional layers of the convolutional neural network model as inputs, deletes one or more pieces of activation function processing performed between the plurality of convolutional layers and integrates the plurality of filters used in the plurality of convolutional layers.

REFERENCE SIGNS LIST

10, 210, 310 Integration device
20 Designation information acquisition unit
22 Data acquisition unit
24 Model storage unit
26 Integration unit
28 Post-integration model storage unit
30 Inference processing unit
250 Inference device
320 Target acquisition unit
322 Selection unit
324 Performance measurement unit
326 Repetition determination unit

The invention claimed is:

1. An integration device that integrates a plurality of filters used in a plurality of convolutional layers of a convolutional neural network model for performing inference processing, the integration device comprising:

a memory; and at least one processor coupled to the memory, the at least one processor being configured to:

use configuration information of the convolutional neural network model and each of the filters used in each of the convolutional layers of the convolutional neural network model as inputs, wherein a combination of the each of the convolutional layers is repeatedly selected to be integrated while increasing a number of the selection of the combination of the convolutional layers, in which the selection of the convolutional layers is repeated until a given target value is satisfied to generated a modified convolutional neural network model, inference is performed using the modified convolutional neural network model, delete one or more pieces of activation function processing performed between the plurality of convolutional layers and integrate the plurality of filters used in the plurality of convolutional layers, and output the inference result.

2. The integration device according to claim 1, wherein the at least one processor is configured to integrate the plurality of filters used in a convolutional layer using a filter of size 1×1 and a convolutional layer at a preceding stage or a subsequent stage of the convolutional layer in the convolutional neural network model.

3. The integration device according to claim 1, wherein the at least one processor is configured to:

select a combination of the plurality of convolutional layers to be integrated in the convolutional neural network model, measure performance of the inference processing using the convolutional neural network model obtained as a result of integration by the integration unit of the plurality of filters used in the selected combination of the plurality of convolutional layers, repeat selection, integration, and measurement until a predetermined repetition end condition is satisfied, output the convolutional neural network model obtained as a result of integration when the measured performance achieves a given target performance, and in a case in which the measured performance does not achieve a given target performance, output the convolutional neural network model as a result of integration when the measured performance is the highest.

4. The integration device according to claim 1, wherein the at least one processor is configured to further integrate a plurality of bias terms used in a convolution operation of the plurality of convolutional layers when integrating the plurality of filters used in the plurality of convolutional layers.

5. The integration device according to claim 1, wherein the at least one processor is configured to:

set each cell of an integrated filter as a target cell, with respect to input data for integration in which a height is a height of an integrated filter, a width is a width of an integrated filter, and a number of channels is a number of channels of a filter of a first-stage convolutional layer to be integrated, and a value of only a cell at a same position as the target cell is set to one and values of other cells are set to zero, extract a combination of the plurality of convolutional layers to be integrated from the convolutional neural network model, and perform the inference processing using a partial model in which all bias terms are set to zero, and by setting a value of an $i^{th}$ channel of a result of the inference processing as a value of the target cell of an $i^{th}$ filter in integrated filters, determine a value of each cell of the integrated filters.

6. The integration device according to claim 4, wherein the at least one processor is configured to:

when integrating a plurality of bias terms, with respect to input data for integration in which a height is a height of an integrated filter, a width is a width of an integrated filter, and a number of channels is a number of channels of a filter of a first-stage convolutional layer to be integrated, and all values are set to zero, perform the inference processing using a partial model obtained by extracting a combination of the plurality of convolutional layers to be integrated from the convolutional neural network model, and by setting a value of an $i^{th}$ channel of a result of the inference processing as a value of a bias term of an $i^{th}$ filter in integrated filters, determine a value of each bias term of the integrated filters.

7. An integration method in an integration device that integrates a plurality of filters used in a plurality of convolutional layers of a convolutional neural network model for performing inference processing, the method comprising:

using configuration information of the convolutional neural network model and each of the filters used in each of the convolutional layers of the convolutional neural network model as inputs, wherein a combination of the each of the convolutional layers is repeatedly selected to be integrated while increasing a number of the selection of the combination of the convolutional layers, in which the selection of the convolutional layers is repeated until a given target value is satisfied to generated a modified convolutional neural network model, performing inference using the modified convolutional neural network model;

deleting one or more pieces of activation function processing performed between the plurality of convolutional layers and integrating the plurality of filters used in the plurality of convolutional layers, and outputting the inference result.

8. A non-transitory storage medium storing an integration program for integrating a plurality of filters used in a plurality of convolutional layers of a convolutional neural network model for performing inference processing, the program executable by a computer to perform integration processing, the integration processing comprising:

using configuration information of the convolutional neural network model and each of the filters used in each of the convolutional layers of the convolutional neural network model as inputs, wherein a combination of the each of the convolutional layers is repeatedly selected to be integrated while increasing a number of the selection of the combination of the convolutional layers, in which the selection of the convolutional layers is repeated until a given target value is satisfied to generated a modified convolutional neural network model, performing inferencing using the modified convolutional neural network model, deleting one or more pieces of activation function processing performed between the plurality of convolutional layers and integrating the plurality of filters used in the plurality of convolutional layers, and outputting the inference result.

* * * * *